United States Patent
Yokokubo

(10) Patent No.: US 12,374,047 B2
(45) Date of Patent: Jul. 29, 2025

(54) INFORMATION PROCESSING APPARATUS, INFORMATION PROCESSING METHOD, AND NON-TRANSITORY COMPUTER-READABLE STORAGE MEDIUM, WITH DETERMINING ARRANGEMENT OF VERTEX GROUP BASED ON INFORMATION RELATED TO IMAGING APPARATUS CHARACTERISTIC AND INFORMATION RELATED TO LENS CHARACTERISTIC

(71) Applicant: CANON KABUSHIKI KAISHA, Tokyo (JP)

(72) Inventor: Yuji Yokokubo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 18/299,160

(22) Filed: Apr. 12, 2023

(65) Prior Publication Data
US 2023/0351695 A1  Nov. 2, 2023

(30) Foreign Application Priority Data
Apr. 27, 2022 (JP) .................................. 2022-073670

(51) Int. Cl.
G06T 7/80 (2017.01)
G06T 3/047 (2024.01)
G06T 17/20 (2006.01)

(52) U.S. Cl.
CPC .............. *G06T 17/20* (2013.01); *G06T 3/047* (2024.01); *G06T 7/85* (2017.01); *G06T 2207/10012* (2013.01); *G06T 2210/56* (2013.01)

(58) Field of Classification Search
None
See application file for complete search history.

(56) References Cited

U.S. PATENT DOCUMENTS

| 9,865,055 | B2 | 1/2018 | Cole et al. | |
| 2020/0380779 | A1* | 12/2020 | Khazov | G06T 7/75 |
| 2021/0263515 | A1* | 8/2021 | Henry | G05D 1/0088 |
| 2022/0058878 | A1* | 2/2022 | Fayette | H04N 21/42222 |
| 2022/0277489 | A1* | 9/2022 | Ali | G06T 7/80 |
| 2022/0392027 | A1* | 12/2022 | Li | G06T 7/13 |

\* cited by examiner

*Primary Examiner* — Joni Hsu
(74) *Attorney, Agent, or Firm* — Venable LLP

(57) ABSTRACT

An information processing apparatus comprises a determination unit configured to determine arrangement of a vertex group on a basis of first information related to characteristics of an imaging apparatus and second information related to characteristics of a lens that is mountable to the imaging apparatus, and a generation unit configured to generate data of a mesh group based on a vertex group in the arrangement determined by the determination unit.

12 Claims, 10 Drawing Sheets

FIG. 4
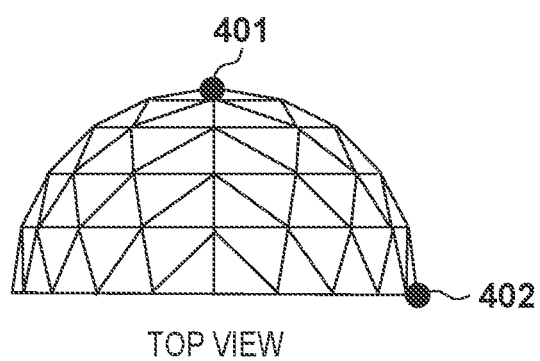
TOP VIEW
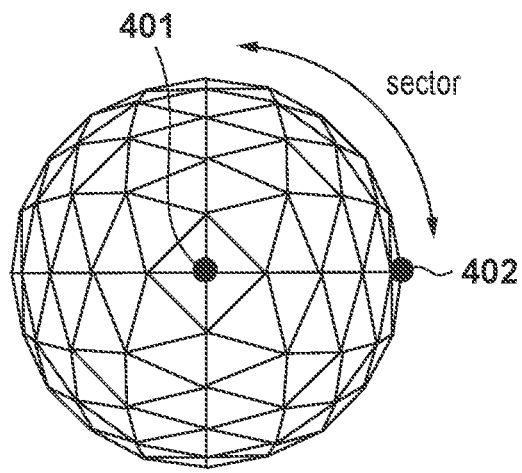
FRONT VIEW
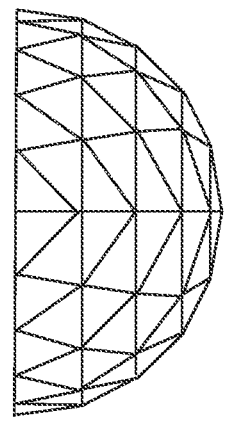
SIDE VIEW

FOCAL LENGTH IS SHORT

FOCAL LENGTH IS LONG

EQUIDISTANT PROJECTION

ORTHOGRAPHIC PROJECTION

FRONT VIEW

NO DISTORTION

FRONT VIEW

DISTORTION

FRONT VIEW

NUMBER OF PIXELS IS LARGE

FRONT VIEW

NUMBER OF PIXELS IS SMALL

FRONT VIEW

NUMBER OF PIXELS IS LARGE

FRONT VIEW

NUMBER OF PIXELS IS SMALL

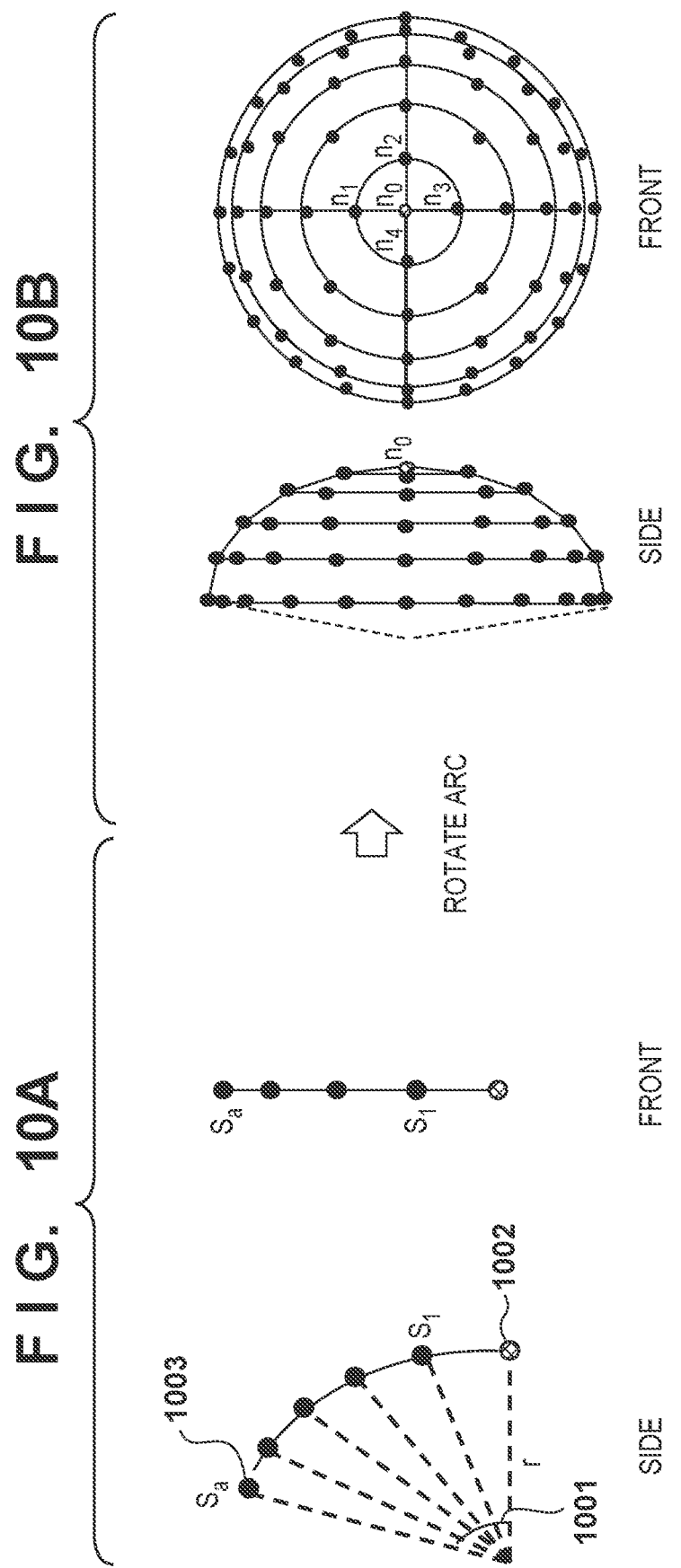

TEXTURE

(54) INFORMATION PROCESSING APPARATUS, INFORMATION PROCESSING METHOD, AND NON-TRANSITORY COMPUTER-READABLE STORAGE MEDIUM, WITH DETERMINING ARRANGEMENT OF VERTEX GROUP BASED ON INFORMATION RELATED TO IMAGING APPARATUS CHARACTERISTIC AND INFORMATION RELATED TO LENS CHARACTERISTIC

BACKGROUND OF THE INVENTION

Field of the Invention

The present invention relates to a technique for generating data of a mesh group.

Description of the Related Art

As a display apparatus used by a viewer to enjoy a video with realistic sensation, there has been proposed a display apparatus that is mounted to the head and detects a direction in which the viewer is viewing, whereby the viewer can view a video with a wide view angle while looking around. In such a display apparatus, if distortion remains in the video, there is a risk that visually induced motion sickness or feeling of strangeness causes poor physical condition to the viewer. Methods of correcting and displaying distortion and projection of a video with a large visual field include a method of reproducing using mesh data.

U.S. Pat. No. 9,865,055 discloses a technique for generating hemispherical mesh data for correcting and displaying a fisheye image captured by an imaging apparatus by capturing a hemisphere as a real object generated by a 3D printer or the like on the basis of hemispherical shape data using the imaging apparatus and associating the captured image with a vertex on the shape data.

In recent years, head mounted displays (HMD) have been widely used, the head mounted displays allowing viewers to enjoy videos full of realistic sensation when mounted to the head to view the videos. In a case of displaying a video on the HMD, processing is performed in which an input video imaged by an imaging apparatus including a fisheye lens is mapped on a mesh and arranged in a three-dimensional CG space, and the mesh is rendered on the basis of a virtual camera to generate a video for display.

SUMMARY OF THE INVENTION

The present invention provides a technique for generating data of a mesh group in accordance with characteristics of an imaging apparatus and characteristics of a lens.

According to the first aspect of the present invention, there is provided an information processing apparatus, comprising: a determination unit configured to determine arrangement of a vertex group on a basis of first information related to characteristics of an imaging apparatus and second information related to characteristics of a lens that is mountable to the imaging apparatus; and a generation unit configured to generate data of a mesh group based on a vertex group in the arrangement determined by the determination unit.

According to the second aspect of the present invention, there is provided an information processing method performed by an information processing apparatus, the method comprising: determining arrangement of a vertex group on a basis of first information related to characteristics of an imaging apparatus and second information related to characteristics of a lens that is mountable to the imaging apparatus; and generating data of a mesh group based on a vertex group in the determined arrangement.

According to the third aspect of the present invention, there is provided a non-transitory computer-readable storage medium that stores a computer program for causing a computer to function as a determination unit configured to determine arrangement of a vertex group on a basis of first information related to characteristics of an imaging apparatus and second information related to characteristics of a lens that is mountable to the imaging apparatus; and a generation unit configured to generate data of a mesh group based on a vertex group in the arrangement determined by the determination unit.

Further features of the present invention will become apparent from the following description of exemplary embodiments with reference to the attached drawings.

BRIEF DESCRIPTION OF THE DRAWINGS

FIG. 4 is a view explaining mesh data;

FIG. 10A is a view illustrating a generation method of a vertex coordinate list;

FIG. 10B is a view illustrating a generation method of a vertex coordinate list;

DESCRIPTION OF THE EMBODIMENTS

Figure 1:
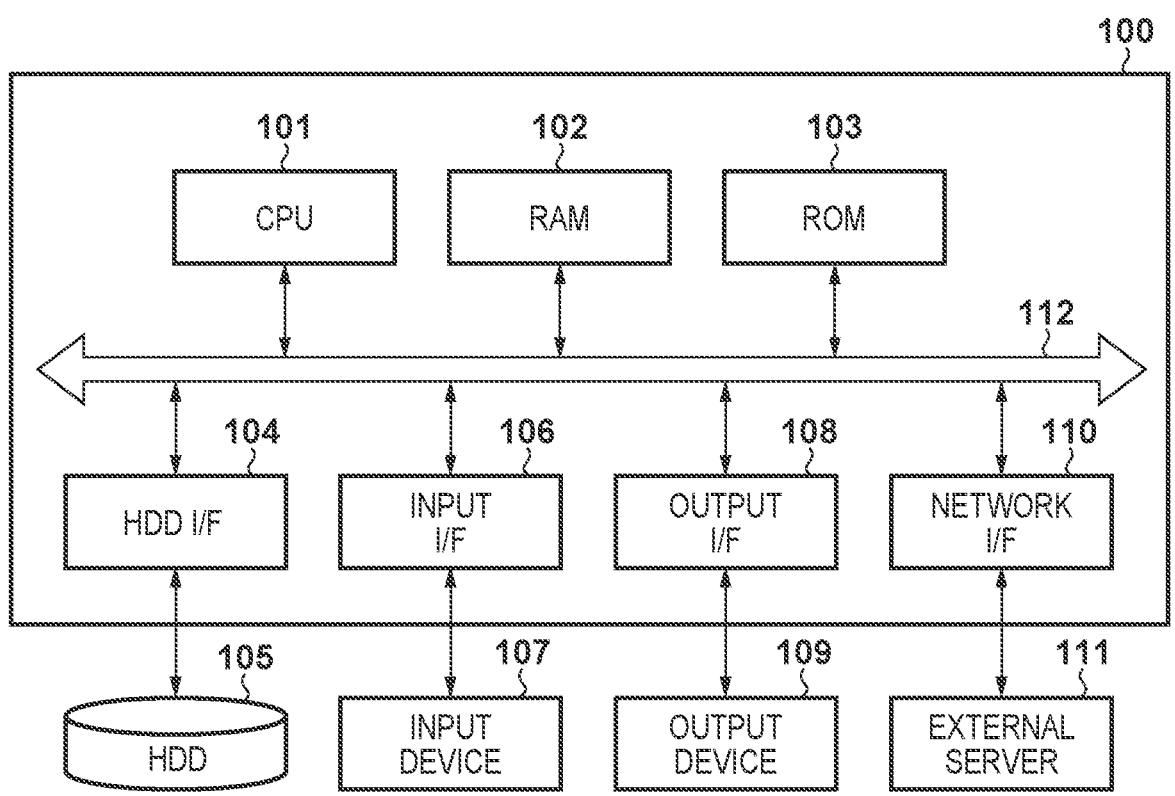
FIG. 1 is a block diagram illustrating an exemplary hardware configuration of an information processing apparatus 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIRST EMBODIMENT

In a case of an interchangeable-lens imaging apparatus, (1) how the captured video is distorted and (2) the imaging range are changed by switching the lens. Therefore, when one piece of mesh data is used with a combination of different lenses and cameras, there are cases where distortion occurs in a display video at the time of viewing depending on the combination of the lens and the mesh, or all imaging ranges cannot be displayed. Therefore, there has been a problem that the viewer has visually induced motion sickness or has a feeling of strangeness when viewing a video displayed on the HMD. In the present embodiment, an example of an information processing apparatus will be described, namely, an information processing apparatus that (1) determines arrangement of a vertex group on the basis of first information related to characteristics of an imaging apparatus and second information related to characteristics of a lens (lens for the imaging apparatus) that is mountable to the imaging apparatus, and (2) generates data of a mesh group based on the vertex group in the arrangement.

First, an exemplary hardware configuration of an information processing apparatus 100 according to the present embodiment will be described, referring to the block diagram illustrated in FIG. 1. A computer apparatus such as a Personal Computer (PC), a smartphone and a tablet terminal apparatus may be applied to such the information processing apparatus 100 according to the present embodiment.

A CPU 101 performs various processes using computer programs and data stored in a RAM 102 or a ROM 103. Accordingly, the CPU 101 controls operation of the entire information processing apparatus 100, and also executes or controls various processing described to be performed by the information processing apparatus 100.

The RAM 102 has an area for storing computer programs and data loaded from the ROM 103 or a hard disk drive (HDD) 105. Furthermore, the RAM 102 has an area for storing computer programs and data received from an external server 111 via a network I/F 110. Furthermore, the RAM 102 has an area for storing various data input from an input device 107. The RAM 102 also includes a work area used when the CPU 101 executes various processing. In this way, the RAM 102 may provide various areas as appropriate.

The ROM 103 stores setting data of the information processing apparatus 100, computer programs and data related to activation of the information processing apparatus 100, computer programs and data related to basic operation of the information processing apparatus 100, and the like.

The HDD 105 is connected to the information processing apparatus 100 via the HDD I/F 104, and the CPU 101 can access the HDD 105 via an HDD I/F 104. The HDD I/F 104 is an I/F such as serial ATA (SATA), for example.

The HDD 105 stores an operating system (OS), computer programs and data for causing the CPU 101 to execute or control various processing described as those being performed by the information processing apparatus 100, and the like. The data stored in the HDD 105 also includes information to be handled as known information in the following description. Computer programs and data stored in the HDD 105 are appropriately loaded into the RAM 102 under the control of the CPU 101 and become processing targets of the CPU 101. The HDD 105 is an example of a secondary storage apparatus.

The input device 107 is connected to the information processing apparatus 100 via an input I/F 106, and the CPU 101 can communicate with the input device 107 via the input I/F 106. The input I/F 106 is a serial bus I/F such as USB or IEEE 1394, for example.

The input device 107 is equipment such as a keyboard, a mouse, a touchscreen, or another user interface, an imaging apparatus such as a camera that can capture a moving image and/or a still image, and a scanner apparatus.

An output device 109 is connected to the information processing apparatus 100 via an output I/F 108, and the CPU 101 can communicate with the output device 109 via the output I/F 108. The output I/F 108 is a video output I/F such as DVI or HDMI (registered trademark), for example.

The output device 109 is an apparatus having a display screen that displays a processing result by the CPU 101 in the form of an image, a character, or the like, and has, for example, a liquid crystal screen or a touchscreen. The output device 109 may be a projection apparatus such as a projector that projects an image or a character.

The CPU 101, the RAM 102, the ROM 103, the HDD I/F 104, the input I/F 106, the output I/F 108, and the network I/F 110 are all connected to a system bus 112.

Figure 2:
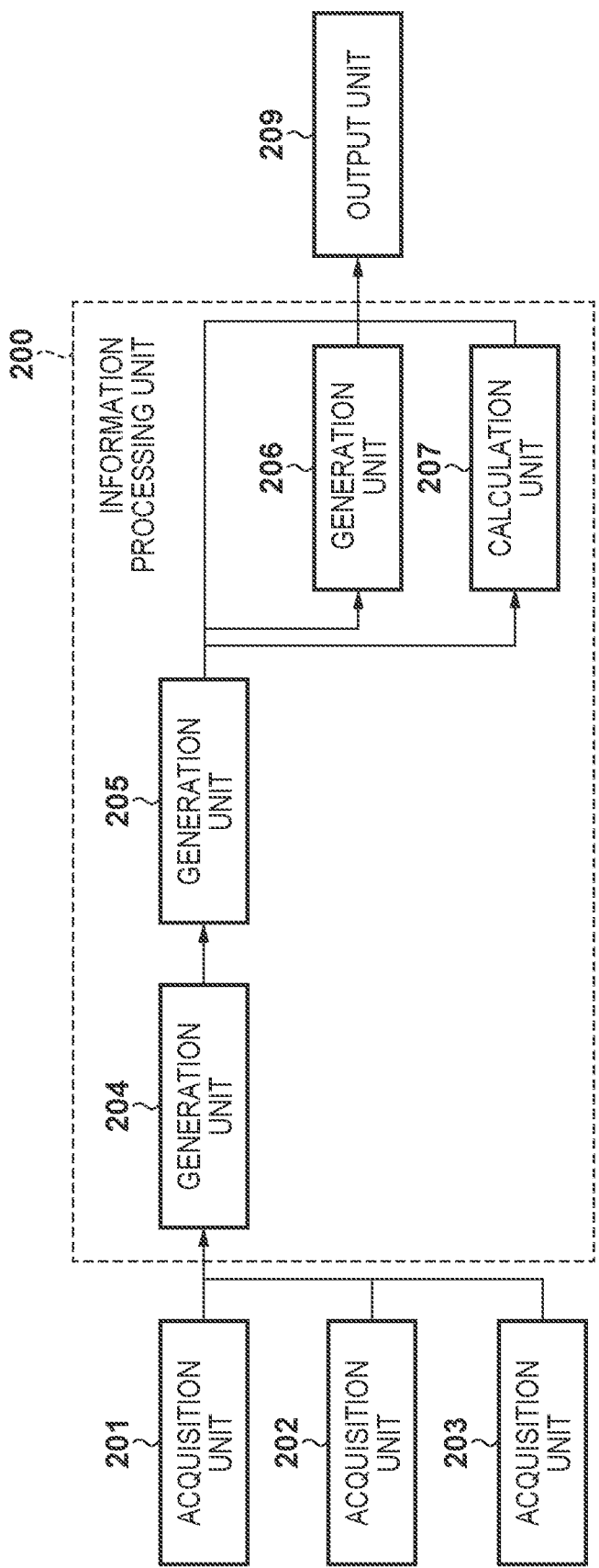
FIG. 2 is a block diagram illustrating an exemplary functional configuration of the information processing apparatus 100.

Next, an exemplary functional configuration of the information processing apparatus 100 according to the present embodiment will be described, referring to the block diagram illustrated in FIG. 2. In the present embodiment, a case where any functional unit illustrated in FIG. 2 is implemented by a computer program will be described. Hereinafter, there is a case where the functional unit illustrated in FIG. 2 is described as a processing subject, but in practice, the function of the functional unit is implemented by the CPU 101 executing a computer program corresponding to the functional unit. One or more of the functional units illustrated in FIG. 2 may be implemented by hardware (hardware such as ASIC or electronic circuit).

The information processing apparatus 100 according to the present embodiment generates data (mesh data) of a mesh object used when a captured image (still image captured regularly or irregularly or image of each frame in moving image) is displayed on a viewing device such as an HMD. Here, the mesh data will be described with reference to FIG. 4.

As illustrated in FIG. 4, the mesh object according to the present embodiment is a hemispherical object including a plurality of meshes (mesh group), and each mesh is a triangular patch. That is, the mesh data is data of a mesh group constituting the mesh object.

The mesh data related to such a mesh object includes information for arranging the mesh object in a three-dimensional virtual space such that the angle from the origin (one point that is the center position of the hemisphere and has the same distance from the vertex of each mesh) of the mesh object to the vertex of the mesh in the mesh object becomes the angle of the incident light recorded in a pixel of the captured image to be mapped to the mesh object.

The captured image is mapped as texture onto a mesh object, and the mesh object to which such mapping is applied is arranged in a three-dimensional virtual space. Then, a rendering image obtained by rendering the texture viewed from the origin of the arranged mesh object is generated as a display image to be displayed on the output device 109. In a case where the output device 109 is an HMD, the generated display image is further subjected to conversion in consideration of characteristics of the device, such as distortion of an eyepiece lens.

The mesh data includes a list (vertex coordinate list) in which the three-dimensional coordinate of the vertex of each mesh is registered, coordinates (UV coordinates) for specifying the two-dimensional coordinates corresponding to the three-dimensional coordinates of the vertices of the mesh in the captured image mapped to the mesh object, and a list (triangle list) in which index of the vertex of each mesh is registered, and the mesh data is data having topology information represented by these pieces of information.

When a captured image is mapped to a mesh object, the accuracy of correction such as distortion at the time of image display changes depending on the arrangement of the vertices of the mesh in the mesh object. The higher the density of the vertices in the mesh object is, the more the accuracy of correction such as distortion at the time of image display is improved. The wider the generation range of the vertices is, the larger the size of the mesh object becomes, and the larger the size of the captured image mapped to such a mesh object becomes. Therefore, by displaying such a captured image, it is possible to present the viewer a captured image with a wider angle of view. The larger the number of vertices is, the higher the load of generation of the mesh object, the above-described mapping, image display, and the like becomes, and the larger the data size of the mesh object also becomes. Therefore, it is necessary to arrange many vertices in a region where the distortion requiring the correction accuracy is large and to arrange the vertices within an appropriate range in accordance with the angle of view.

In the present embodiment, the arrangement of the vertex groups is determined in accordance with the characteristics of the imaging apparatus that has captured the captured image to be mapped to the mesh object and the characteristics of the lens that is mountable to the imaging apparatus, and the mesh object including the vertex group of the determined arrangement is generated. Various lenses such as a fisheye lens can be used as the lens.

Examples of a mesh object to which a captured image by an imaging apparatus mounted with a lens having a long focal length is mapped and a mesh object to which a captured image by an imaging apparatus mounted with a lens having a short focal length is mapped will be described with reference to FIGS. 5A and 5B.

Figure 5A:
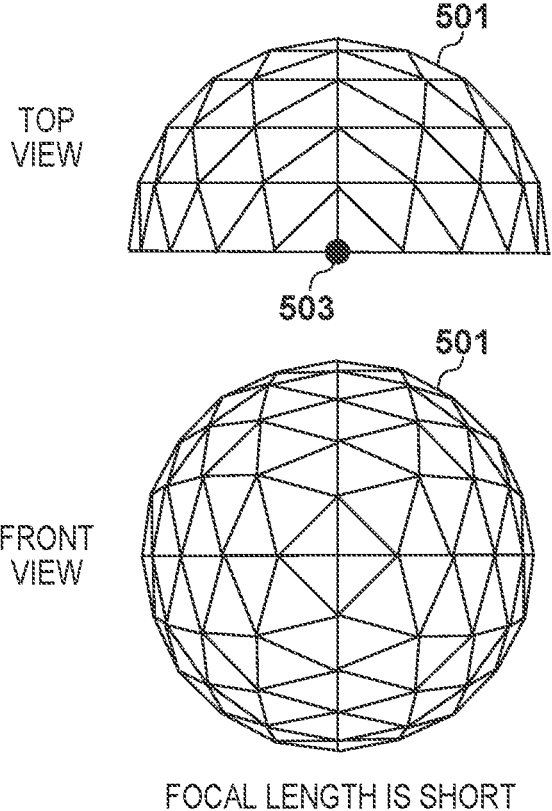
FIG. 5A is a view illustrating an example of a mesh object.
Figure 5B:
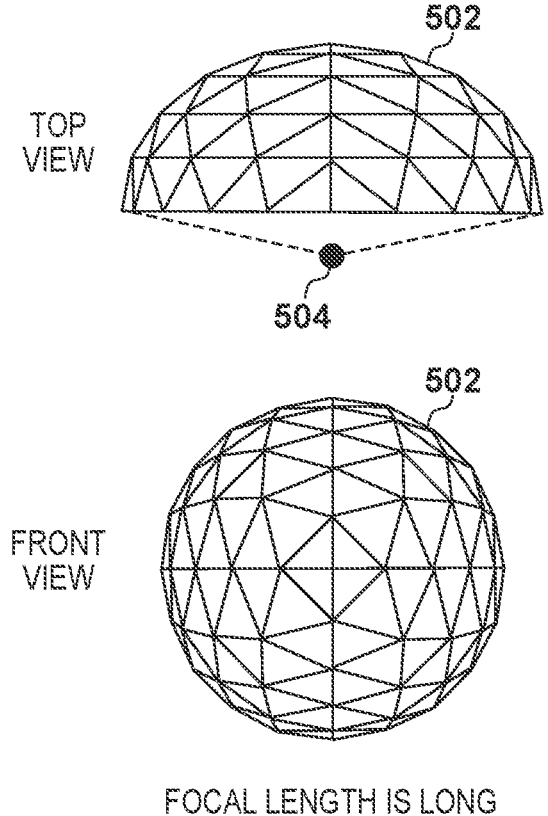
FIG. 5B is a view illustrating an example of a mesh object.

FIG. 5A illustrates an example of a mesh object 501 to which an image captured by an imaging apparatus mounted with a lens having a focal length f1 is to be mapped. FIG. 5B illustrates an example of a mesh object 502 to which an image captured by an imaging apparatus mounted with a lens having a focal length f2 (>f1) is to be mapped.

In a case where the focal length is short, the angle of view becomes wide, and thus, it is necessary to widen the arrangement range of the vertices (that is, the generation range of the mesh) in order to display the entire imaging region. Therefore, in the present embodiment, a mesh object is generated, in which vertices are arranged in a wider range and the mesh is arranged in a wider range as the focal length of the lens is shorter.

Since the wider the light receiving region of an image sensor included in the imaging apparatus is, the wider the angle of view becomes, it is necessary to widen the arrangement range of the vertices (that is, the generation range of the mesh) in order to display the entire imaging region. Therefore, in the present embodiment, a mesh object is generated, in which vertices are arranged in a wider range and the mesh is arranged in a wider range as the light receiving region of the image sensor included in the imaging apparatus is wider.

In FIG. 5A, a point 503 is the origin of the mesh object 501 (the origin of the hemisphere represented by the mesh object 501), and a point 504 is the origin of the mesh object 502 (the origin of the hemisphere represented by the mesh object 502). In the case of FIG. 5A, a captured image mapped to the mesh object 501 viewed from a virtual viewpoint arranged at the position of the point 503 is rendered as a display image. In the case of FIG. 5B, a captured image mapped to the mesh object 502 viewed from a virtual viewpoint arranged at the position of the point 504 is rendered as a display image.

In the case of a hemispherical mesh object, the display region can be represented by an angle. As illustrated in FIGS. 5A and 5B, by controlling the position of the vertex of each mesh in the mesh object on the basis of the focal length, it is possible to control the angle of view of the display image.

Figure 6A:
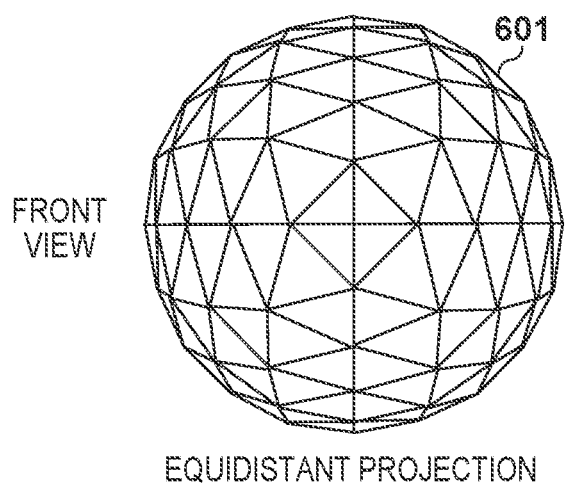
FIG. 6A is a view illustrating an example of a mesh object.
Figure 6B:
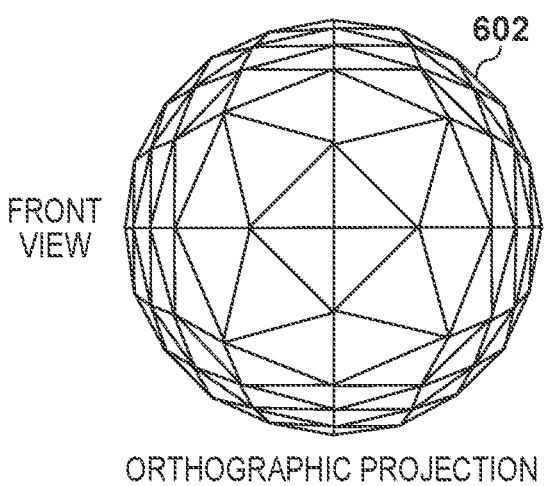
FIG. 6B is a view illustrating an example of a mesh object.

Next, FIG. 6A illustrates an example of a mesh object 601 to which an image captured by an imaging apparatus mounted with an equidistant projection lens is to be mapped. FIG. 6B illustrates an example of a mesh object 602 to which an image captured by an imaging apparatus mounted with an orthographic projection lens is to be mapped.

Since an interval of incident light varies depending on a lens projection method, the interval of the incident angle of a light beam recorded in adjacent pixels of a captured image varies. In the equidistant projection, since the distance from the projection center on the captured image is proportional to the incident angle of the light beam with respect to the front, in the present embodiment, the vertices are arranged such that the angles from the origin of the mesh object become equal. On the other hand, in the case of the orthographic projection, since the interval of the incident angle of a light beam recorded in adjacent pixels becomes narrower in the periphery of a captured image than in the center of the captured image, in the present embodiment, each vertex is arranged such that the interval of the vertex becomes narrower as the vertex is closer to the periphery of the captured image.

By calculating the interval between the vertices in the radial direction of the hemisphere on the basis of the projection method of the lens, it is possible to generate a desired mesh object even if the lens to be mounted on the imaging apparatus is switched to another lens having a different projection method. This makes it possible to perform display with less deviation at the time of display, and it is possible to reduce a feeling of strangeness at the time of viewing.

Figure 7A:
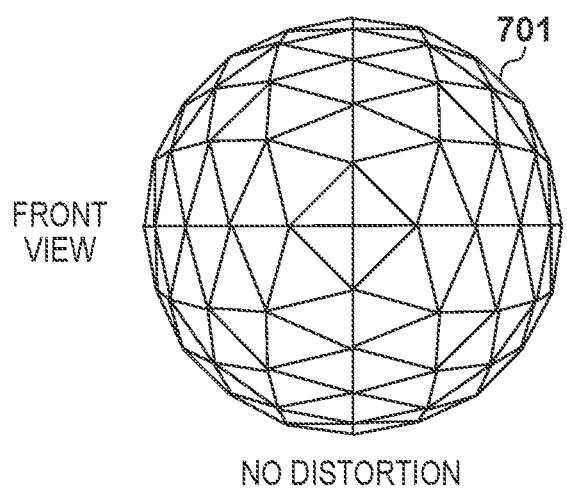
FIG. 7A is a view illustrating an example of a mesh object.
Figure 7B:
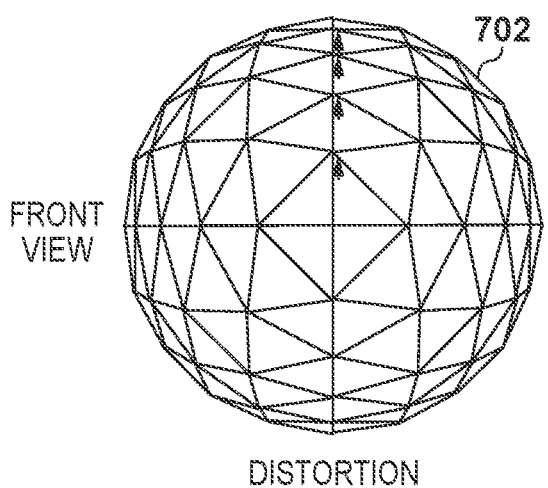
FIG. 7B is a view illustrating an example of a mesh object.

FIG. 7A illustrates an example of a mesh object 701 to which an image captured by an imaging apparatus mounted with a lens without distortion is to be mapped. FIG. 7B illustrates an example of a mesh object 702 to which an image captured by the imaging apparatus mounted with a lens with distortion is to be mapped.

Since the incident angle of incident light changes due to distortion, the interval of the light recorded in adjacent pixels of the captured image varies. In the present embodiment, when there is distortion, vertices are arranged at positions adjusted based on the distortion ratio to adjust the arrangement density of the vertices. This makes it possible to improve distortion correction accuracy and display a captured image that reduces the feeling of strangeness at the time of viewing.

Figure 8A:
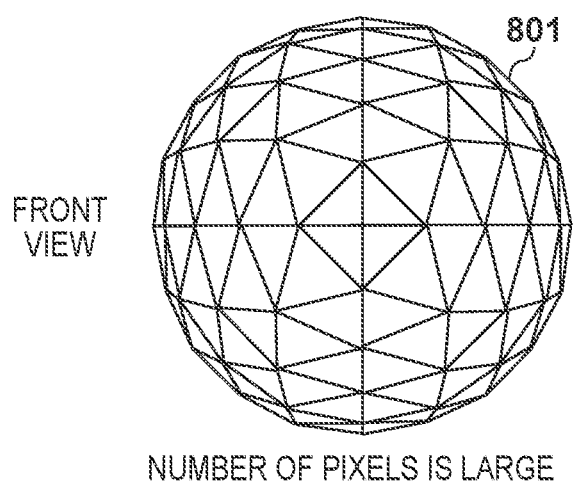
FIG. 8A is a view illustrating an example of a mesh object.
Figure 8B:
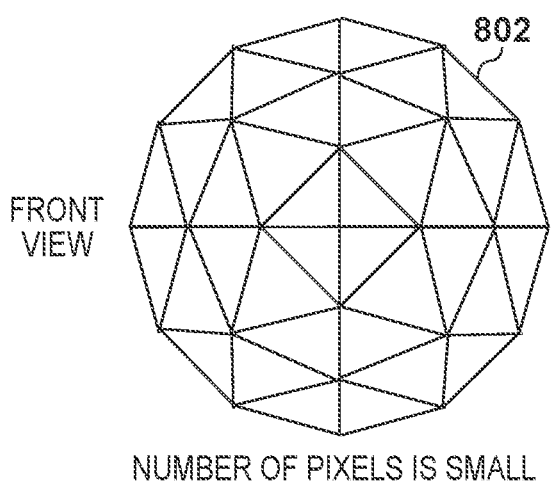
FIG. 8B is a view illustrating an example of a mesh object.
Figure 9A:
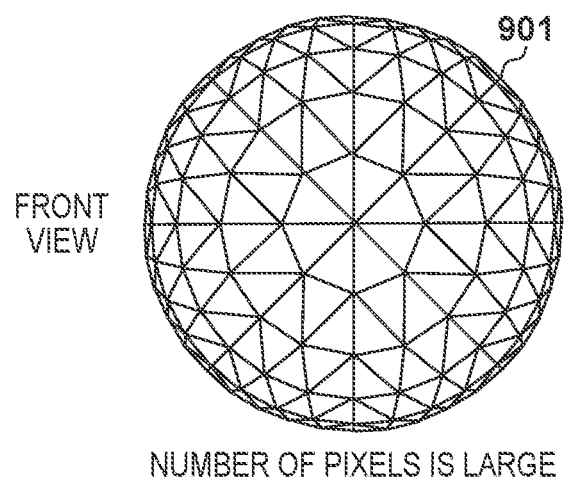
FIG. 9A is a view illustrating an example of a mesh object.
Figure 9B:
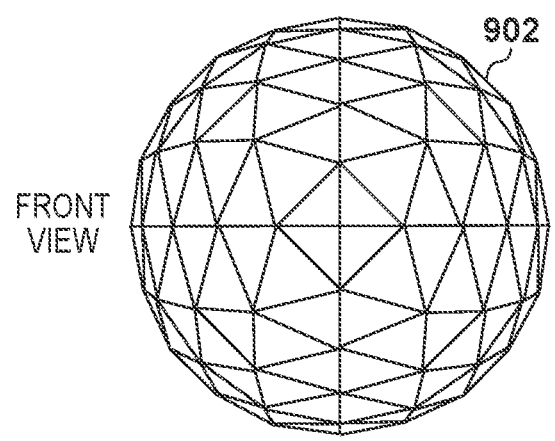
FIG. 9B is a view illustrating an example of a mesh object.

FIGS. 8A and 9A illustrate examples of mesh objects generated in a case where the user operates the imaging apparatus to set a large number of imaging pixels. FIGS. 8B and 9B illustrate examples of mesh objects generated in a case where the user operates the imaging apparatus to set a small number of imaging pixels.

In the present embodiment, when a larger number of imaging pixels are set, as illustrated in FIGS. 8A and 9A, the number of vertices is increased to form a mesh object with a larger number of vertices. On the other hand, in the present embodiment, when a smaller number of imaging pixels are set, as illustrated in FIGS. 8B and 9B, the number of vertices is reduced to form a mesh object with a smaller number of vertices.

As described above, by changing the number of vertices in accordance with the number of imaging pixels, it is possible to control the correction accuracy of distortion at the time of display, the time required to generate the mesh, the data size of the mesh object, and the load at the time of reproduction of the mesh object.

Next, processing performed by the information processing apparatus 100 to generate mesh data will be described with reference to the flowchart of FIG. 3. In step S301, an acquisition unit 202 acquires a lens parameter (lens information) indicating characteristics of a lens that is mountable to the imaging apparatus. The lens parameter is a parameter including information indicating lens characteristics such as a lens projection method, a lens focal length, and lens distortion information (including presence or absence of distortion and a distortion ratio). The acquisition method of the lens parameter is not limited to a specific acquisition method, and for example, the lens parameter may be acquired from the imaging apparatus or may be acquired from metadata of a captured image stored in the HDD 105.

In step S302, the acquisition unit 201 acquires a camera parameter (camera information) indicating characteristics of the imaging apparatus. The camera parameter is a parameter including information indicating characteristics of the imaging apparatus such as the size of the image sensor, the number of pixels of the image sensor, and a principal point position. The acquisition method of the camera parameter is not limited to a specific acquisition method, and for example, the lens parameter may be acquired from the imaging apparatus or may be acquired from metadata of a captured image stored in the HDD 105.

In step S303, the acquisition unit 203 acquires a mesh generation parameter, which is a parameter required for generating a mesh object. The mesh generation parameter includes the numbers of vertices k and p per pixel, for example. The acquisition method of the mesh generation parameter is not limited to a specific acquisition method, and for example, the mesh generation parameter may be acquired from the HDD 105.

In step S304, a generation unit 204 generates a reference vertex list by using the lens parameter acquired in step S301, the camera parameter acquired in step S302, and the mesh generation parameter acquired in step S303.

In step S305, using the reference vertex list generated in step S304, the generation unit 205 generates, as a vertex coordinate list, a list in which the three-dimensional coordinate of the vertex of each mesh in the mesh object is registered.

In the present embodiment, a case of generating mesh data of a dome-shaped mesh object in which vertices are arranged on a concentric circle will be described. The mesh data will be described with reference to FIG. 4 as an example.

The mesh data is generated on the basis of a number c of sectors, a frequency a, an angle of view θ, the lens parameter, and the camera parameter. A sector refers to one fan-shaped region obtained by dividing a hemisphere (circular shape) viewed from the front as illustrated in the front view of FIG. 4 into a plurality of fan shapes. The number c of sectors is equal to the number of vertices on the circumference outside a center vertex 401 by one in the front view of FIG. 4. In the mesh object, vertices are arranged concentrically, and the number of vertices on a circle C' outside by one with respect to a certain circle C is larger than the number of vertices on the circle C by the number of sectors. The frequency a is the number of divisions of an arc from the vertex 401 to a vertex 402 (the vertex of the other end when the vertex 401 is one end of the sector boundary) as illustrated in the top view of FIG. 4. The angle of view θ is an angle of view of the captured image mapped to the mesh object. In FIG. 4, the number c of sectors=4, the frequency a=5, and the angle θ of view=180° are established.

The lens parameter and the camera parameter are used for calculating coordinates of a corresponding position (projection position) in a captured image when a position (three-dimensional position) in a real space (three-dimensional space) is captured by the imaging apparatus. A projection function x=P (VC) for calculating a "UV coordinate x" from a "three-dimensional coordinate VC in a camera coordinate system (coordinate system based on the position and attitude of the imaging apparatus)" is defined on the basis of the lens parameter and the camera parameter. In the case of the imaging apparatus including a fisheye lens, the projection function projects the three-dimensional coordinate VC onto the two-dimensional coordinate on the captured image in consideration of the projection method, the focal length, and the distortion of the fisheye lens, converts the two-dimensional coordinate into the UV coordinate x in the UV coordinate system, and calculates the UV coordinate x.

Next, a generation method of a list (vertex coordinate list) in which the three-dimensional coordinate of the vertex of each mesh in such a mesh object is registered will be described with reference to FIGS. 10A and 10B as an example.

In step S304, as illustrated in FIG. 10A, a list in which the three-dimensional coordinate of each vertex (each vertex from a vertex 1002 to a vertex 1003) arranged on an arc is registered is generated as a reference vertex list.

In step S305, as illustrated in FIG. 10B, the vertex whose three-dimensional coordinate is registered in the reference vertex list is arranged at an equal interval around the front direction about the origin of the mesh object, thereby arranging the vertex group in the mesh object. Then, a list in which the three-dimensional coordinate of each of the arranged vertex group is registered is generated as a vertex coordinate list.

The reference vertex list is generated as follows. The reference vertex list is a list in which the three-dimensional coordinate of each vertex arranged on the arc on the basis of the frequency a, the angle of view θ, and a radius R of the hemisphere is registered. Since the angle from the origin of the mesh object is important, any radius R may be used (predetermined value).

As illustrated in FIG. 10A, the vertex 1002, which is the start point of the arc, is arranged at a position separated by the radius R from an appropriate position (the position of the origin of the mesh object). Then, the position of the vertex 1003, which is the end point of the arc, is calculated such that an angle 1001 formed by the line segment connecting the vertex 1002 and the origin and the line segment connecting the vertex 1003 and the origin becomes half the angle of view θ. In a fisheye lens of equidistant projection, the angle of view θ can be obtained by calculating θ=s/f from a focal length f and a transverse width s of the image sensor. Here, the angle of view θ is calculated on the basis of the transverse width of the image sensor, but the angle of view θ may be calculated on the basis of the height or the diagonal length of the image sensor. Next, vertices are arranged at respective positions equally dividing, into a, the arc having the vertex 1002 as one end and the vertex 1003 as the other end, and a list in which a vertex sequence (the vertex 1003, and a vertex arranged at each position equally dividing the arc into a) excluding the vertex 1002 among the vertices on the arc is registered is generated as a reference vertex list. Here, the frequency a can be obtained by calculating a=w×k from the number w of pixels in the horizontal direction and the number k of vertices per pixel of the captured image to be mapped on the mesh object.

In the reference vertex list, for example, three-dimensional coordinates of a vertices Sj (j=1, ..., a) are registered in the order of proximity from the vertex 401, which is the center in the front view of FIG. 4. In the case where the lens projection is equidistant projection, the vertices are equally spaced. In the case of orthographic projection, the arrangement interval of vertices may be changed depending on the projection method, such as arranging vertices such that the interval becomes narrower as j increases. In the case where there is distortion of the lens, the position of the vertex may be adjusted based on the distortion ratio with respect to the position of the vertex calculated in accordance with the projection method. For example, in the case of equidistant projection, when the distortion ratio of the vertex Sj representing the ratio between an ideal image height and a real image height is dj, an angle $\varphi_j$ of the vertex Sj can be calculated as $\varphi_j=\varphi_{j-1}+d_j\theta/(2D)$ where D is the sum of the distortion ratios of all reference vertices (vertices whose three-dimensional coordinates are registered in the reference vertex list).

In this manner, by generating the reference vertex list on the basis of the camera parameter and the lens parameter, it is possible to generate mesh data with the vertex generation range and the vertex density suitable for the characteristics of the lens and the characteristics of the imaging apparatus.

The number c of sectors can be obtained by calculating c=pπw/a from the number p of vertices per pixel. Here, π is the circular constant. Then, as illustrated in FIG. 10B, a list in which the three-dimensional coordinate of each of a vertex v0 at the center and vertices (vertices on the innermost concentric circle are v1, v2, v3, and v4) arranged by rotating each reference vertex Sj by 360 degrees by 2π/(j×c) [°] at equal intervals around the front direction about the origin is registered is generated as a vertex coordinate list. Three-dimensional coordinates of N vertices are registered in the vertex coordinate list. Here, N=1+c×a×(a+1)/2. Both the frequency a and the number c of sectors may be controlled, or only one may be controlled with the one as a fixed value.

In this manner, by generating the vertex coordinate list on the basis of the camera parameter and the lens parameter, it is possible to generate mesh data with the vertex generation range and the vertex density suitable for the characteristics of the lens and the characteristics of the imaging apparatus.

Returning to FIG. 3, next, in step S306, using the vertex coordinate list generated in step S305, a generation unit 206 generates, as a triangle list, a list of indices of three vertices of each mesh (triangle) constituting the mesh object. A generation method of a triangle list will be described with reference to FIGS. 11A to 11C as an example.

Figures 11A, 11B, 11C:
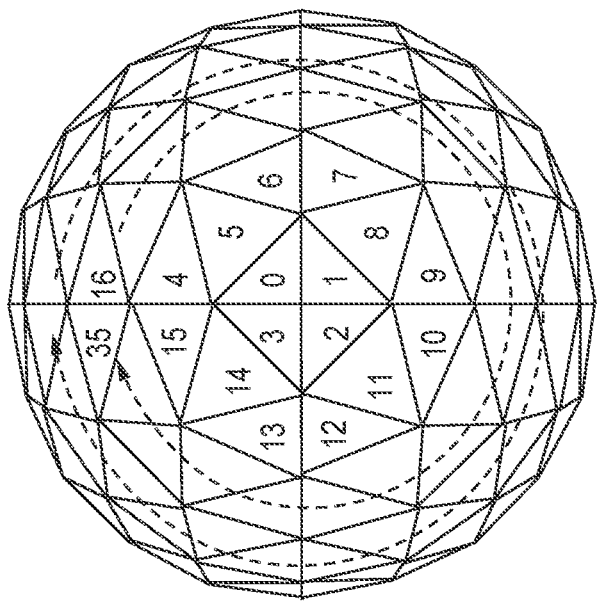
FIG. 11A is a view illustrating a generation method of a triangle list.
FIG. 11B is a view illustrating a generation method of a triangle list.
FIG. 11C is a view illustrating a generation method of a triangle list.

Since the vertex of each mesh is identified by a vertex index, one mesh can be represented as a mesh (i, j, k) with the vertex indices of three vertices as one set. That is, the mesh is represented by a set of a plurality of vertex indices. As illustrated in FIG. 11A, the vertex index of the central vertex is 0, the vertex indices of the vertices on the innermost concentric circle are 1, 2, 3, and 4 clockwise, and the vertex indices of the vertices on the second innermost concentric circle are 5, 6, ... clockwise.

As illustrated in FIG. 11B, the indices (surface numbers) of the meshes on the innermost concentric circle are 0, 1, 2, and 3 clockwise, and the indices of the mesh on the second inner concentric circle are 4, 5, ..., and 15 clockwise.

Then, as illustrated in FIG. 11C, for each mesh, a triangle list in which the surface number of the mesh and the vertex index of each vertex constituting the mesh are registered in association with each other is generated.

In step S307, a calculation unit 207 obtains two-dimensional coordinate on the captured image mapped to the mesh object corresponding to the respective three-dimensional coordinates registered in the vertex coordinate list generated in step S305, specifies the coordinate (UV coordinate) corresponding to the two-dimensional coordinate in the UV coordinate, and generates, as a UV coordinate list, a list in which the specified UV coordinate is registered.

Figure 12:
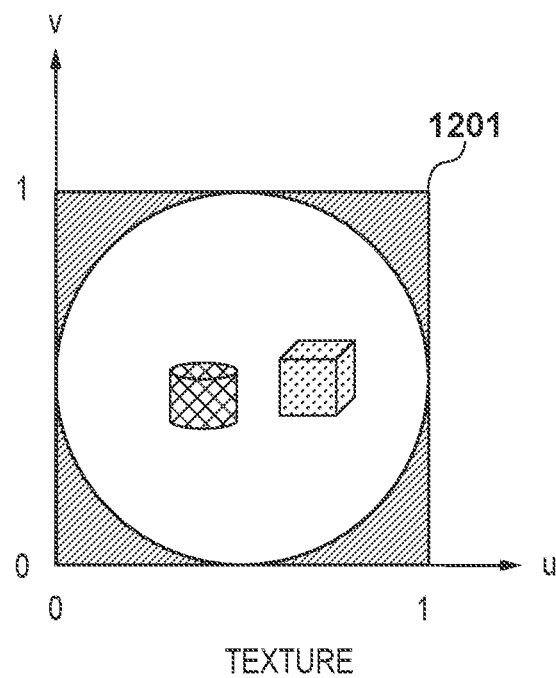
FIG. 12 is a view illustrating an example of UV coordinates.

An example of the UV coordinate is illustrated in FIG. 12. The UV coordinate represents a correspondence between the vertex of the mesh object and the two-dimensional coordinate on the captured image (a captured image captured using a fisheye lens in FIG. 12), which is a texture. For example, when the three-dimensional coordinate of the vertex of the mesh object is (x, y, z) and the corresponding UV coordinate is (u, v), one point on the texture corresponding to the UV coordinate (u, v) is associated with the three-dimensional coordinate (x, y, z). When the mesh (that is, a partial image corresponding to the mesh in the texture) is displayed, a color in the UV coordinate (u, v) of the texture is displayed at a pixel position corresponding to the three-dimensional coordinate (x, y, z). In the present embodiment, the UV coordinate is represented by a coordinate system in which a right end becomes u=1 and an upper end becomes v=1 with a horizontal axis u, a vertical axis v, a lower left of the captured image being the origin (0, 0). A possible range of the UV coordinate is [0 to 1] for both u and v.

The UV coordinate with respect to a three-dimensional coordinate Vi of the vertex registered in the vertex coordinate list is calculated, and a UV coordinate list, which is a list in which the calculated UV coordinate is registered, is generated. In the UV coordinate list, UV coordinates corresponding to N vertices are registered. A three-dimensional coordinate Vci of the vertex in the camera coordinate system is projected onto the captured image by a projection function P of the imaging apparatus, and a UV coordinate Xi=P(Vci) is calculated.

In step S308, an output unit 209 generates, as mesh data, data including the vertex coordinate list generated in step S305, the triangle list generated in step S306, and the UV coordinate list generated in step S307. Then, the output unit 209 outputs the generated mesh data as a file. The output destination of the file by the output unit 209 is not limited to a specific output destination. For example, the output unit 209 may output (store) the file to the HDD 105 or may output (transmit) the file to the external server 111 via the network I/F 110. The output unit 209 may use the generated mesh data as metadata of a captured image to be mapped to a mesh object, and generate and output a file including the captured image and the mesh data.

Figure 3:
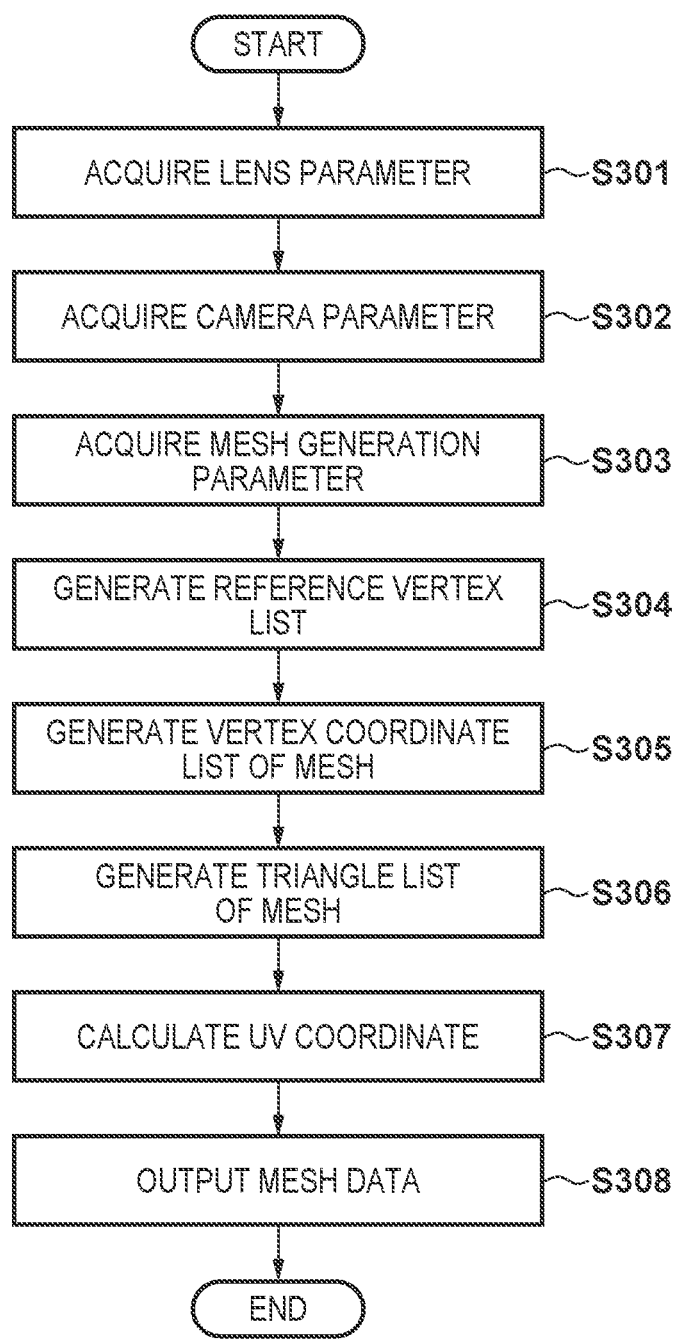
FIG. 3 is a flowchart of processing performed by the information processing apparatus 100 to generate mesh data.

The processing in accordance with the flowchart of FIG. 3 is performed in a case where characteristics of the imaging apparatus or characteristics of the lens are changed such as, for example, in a case where various settings in the imaging apparatus are changed or in a case where a lens that is mountable to the imaging apparatus is replaced with a lens having another characteristic.

Mesh data may be stored in the HDD 105, a mesh object based on the stored mesh data may be generated when a captured image is displayed, and a captured image mapped to the generated mesh object may be set as a display target.

As described above, according to the present embodiment, even when the characteristics of the imaging apparatus and/or the characteristics of the lens change, the mesh data can be generated on the basis of the characteristics of the lens and the characteristics of the imaging apparatus. Therefore, for example, even in a case where the lens is changed in the interchangeable-lens imaging apparatus, it is possible to generate mesh data in consideration of distortion due to a combination of the lens and the imaging apparatus and a difference in the imaging range. This makes it possible to generate mesh data that can reduce a feeling of strangeness when viewing a captured image displayed on a display apparatus such as the HMD.

The information processing apparatus 100 according to the present embodiment can be used in the following system, for example. The information processing apparatus 100 generates a mapping captured image obtained by mapping a captured image captured by the imaging apparatus included in the HMD onto mesh object. Then, the information processing apparatus 100 transmits the generated mapping captured image to the display screen of the HMD, the output device 109, or other equipment.

The information processing apparatus 100 may cause the output device 109 to display, side by side, a captured image and a mapping captured image obtained by mapping the captured image onto the mesh object. In this case, the user can perform various adjustments/settings related to generation of the mesh data, such as adjusting various parameters for generating mesh data by comparing the captured image with the mapping captured image. The information processing apparatus 100 may display a mesh object generated on the basis of the current mesh data onto the output device 109 or the like in addition to or instead of the captured image and the mapping captured image.

Second Embodiment

In the first embodiment, the mesh object is a hemispherical object. However, the shape of the mesh object is not limited to the hemisphere, and thus, the generation method of the mesh data is not limited to a specific generation method as long as the generation method provides arrangement of the vertices in consideration of the above properties in accordance with the camera parameter and the lens parameter.

In the first embodiment, it has been described that all the meshes are triangular patches, but the present invention is not limited to this, and the mesh may be a polygonal patch such as a quadrangle or more, and a plurality of types of patches may be used such as a triangular patch and a quadrangular patch. That is, although the topology information is a triangle list in the first embodiment, the topology information may be expressed by a polygon list represented by another polygon such as a quadrangular list.

The information processing apparatus 100 may input a fisheye moving image with parallax as a mapping target. The fisheye moving image with parallax is a moving image in which two moving images with parallax captured by a parallax imaging apparatus including two fisheye lenses are arranged left and right. In this case, the first embodiment is only required to be applied with the image of each frame constituting the fisheye moving image as a captured image. Instead of the moving image, a still image captured regularly or irregularly may be used.

Alternatively, the numerical values, processing timings, processing orders, processing entities, and data (information) transmission destinations/transmission sources/storage locations, and the like used in the embodiments described above are referred to for specific description as an example, and are not intended for limitation to these examples.

Alternatively, some or all of the embodiments described above may be used in combination as appropriate. Alternatively, some or all of the embodiments described above may be selectively used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-073670, filed Apr. 27, 2022, which is hereby incorporated by reference herein in its entirety.

What is claimed is:

1. An information processing apparatus comprising:
a processor and a memory, the processor and the memory being configured to function as a plurality of units comprising:

(1) a determination unit configured to determine arrangement of a vertex group on a basis of first information related to characteristics of an imaging apparatus and second information related to characteristics of a lens that is mountable to the imaging apparatus; and (2) a generation unit configured to generate data of a mesh group based on a vertex group in the arrangement determined by the determination unit, wherein the determination unit determines the arrangement in which an interval between vertices becomes an interval in accordance with a projection method of the lens.

2. The information processing apparatus according to claim 1, wherein the determination unit determines arrangement of the vertex group by using a vertex sequence arranged on an arc in accordance with the first information and the second information.

3. The information processing apparatus according to claim 1, wherein the generation unit generates the data including a list of a three-dimensional coordinate of each of the vertex group, a list of a coordinate for specifying a two-dimensional coordinate corresponding to a three-dimensional coordinate of a vertex of a mesh in a captured image mapped to a mesh object having the vertex group, and a list of an index of each mesh defined by the vertex group.

4. The information processing apparatus according to claim 1, wherein the determination unit and the generation unit operate after characteristics of the imaging apparatus and/or characteristics of the lens have changed.

5. The information processing apparatus according to claim 1, wherein the plurality of units further comprises an output unit configured to use the data as metadata of a captured image to be mapped to a mesh object including the mesh group, and generate and output a file including the captured image and the data.

6. The information processing apparatus according to claim 1, further comprising a unit configured to display a captured image and a mapping captured image obtained by mapping the captured image onto a mesh object including the mesh group.

7. The information processing apparatus according to claim 1, further comprising a unit configured to display a mesh object including the mesh group.

8. The information processing apparatus according to claim 1, wherein a captured image to be mapped to a mesh object including the mesh group is a captured image captured using a fisheye lens.

9. The information processing apparatus according to claim 1, wherein a captured image to be mapped to a mesh object including the mesh group is an image of each frame of a moving image in which two moving images having parallax captured by an imaging apparatus including two fisheye lenses are arranged on left and right.

10. The information processing apparatus according to claim 1, wherein the determination unit determines the arrangement of the vertex group to be different in a case where the projection method of the lens is equidistant projection from the arrangement of the vertex group in a case where the projection method of the lens is orthographic projection.

11. An information processing method performed by an information processing apparatus, the method comprising:
determining arrangement of a vertex group on a basis of first information related to characteristics of an imaging apparatus and second information related to characteristics of a lens that is mountable to the imaging apparatus; and
generating data of a mesh group based on a vertex group in the determined arrangement; and
wherein the determining determines the arrangement in which an interval between vertices becomes an interval in accordance with a projection method of the lens.

12. A non-transitory computer-readable storage medium that stores a computer program for causing a computer, the computer comprising a processor and a memory, to function as a plurality of units comprising:
a determination unit configured to determine arrangement of a vertex group on a basis of first information related to characteristics of an imaging apparatus and second information related to characteristics of a lens that is mountable to the imaging apparatus; and
a generation unit configured to generate data of a mesh group based on a vertex group in the arrangement determined by the determination unit,
wherein the determination unit determines the arrangement in which an interval between vertices becomes an interval in accordance with a projection method of the lens.

* * * * *